United States Patent
Kawamoto et al.

(10) Patent No.: US 8,331,336 B2
(45) Date of Patent: Dec. 11, 2012

(54) RADIO COMMUNICATIONS APPARATUS AND A METHOD FOR REESTABLISHING A NETWORK WITH A JOIN SIGNAL TRANSMITTED AT VARIABLE TIMING

(75) Inventors: Yasutaka Kawamoto, Osaka (JP); Tadamichi Tagawa, Nara (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 946 days.

(21) Appl. No.: 12/382,165

(22) Filed: Mar. 10, 2009

(65) Prior Publication Data

US 2009/0233638 A1 Sep. 17, 2009

(30) Foreign Application Priority Data

Mar. 14, 2008 (JP) .................. 2008-065819

(51) Int. Cl.
 *H04B 7/00* (2006.01)
 *H04L 12/28* (2006.01)
(52) U.S. Cl. .................. 370/338; 370/408; 455/517
(58) Field of Classification Search .................. 370/408, 370/448, 338; 455/517
 See application file for complete search history.

(56) References Cited

U.S. PATENT DOCUMENTS

| | | | |
|---|---|---|---|
| 6,917,606 B2 | 7/2005 | Sashihara | |
| 2004/0253970 A1 | 12/2004 | Kunihiro | |
| 2006/0067232 A1 | 3/2006 | Lee et al. | |
| 2007/0004391 A1* | 1/2007 | Maffeis | 455/418 |
| 2007/0133587 A1* | 6/2007 | Hibino et al. | 370/428 |
| 2007/0183439 A1* | 8/2007 | Osann, Jr. | 370/406 |
| 2007/0189252 A1* | 8/2007 | Kawakami | 370/338 |
| 2007/0224978 A1* | 9/2007 | Wherry et al. | 455/414.2 |
| 2008/0112325 A1* | 5/2008 | Sivakumar et al. | 370/238 |
| 2009/0097456 A1* | 4/2009 | Zhu et al. | 370/336 |

FOREIGN PATENT DOCUMENTS

| | | |
|---|---|---|
| JP | 2001237764 A | 8/2001 |
| JP | 2001-274810 A | 10/2001 |
| JP | 2003-318917 A | 11/2003 |
| JP | 2005072861 A | 3/2005 |
| JP | 2005080316 A | 3/2005 |
| JP | 2006050461 A | 2/2006 |
| JP | 2006-94527 | 4/2006 |
| JP | 2006-237854 A | 9/2006 |

OTHER PUBLICATIONS

"ZigBee Specification", Document 053474r13, ZigBee Alliance, pp. 323-352, 2006.

* cited by examiner

*Primary Examiner* — Brian D Nguyen
(74) *Attorney, Agent, or Firm* — Rabin & Berdo, P.C.

(57) ABSTRACT

A radio communications apparatus includes a network position detector for detecting information on the position of the communication device on a radio telecommunications network, a network connection detector for detecting the disengagement of the device from the network, and a controller for controlling the transmission timing of join signals. The controller is adapted to vary a transmission timeout period, upon expiring of which a join signal is sent out, depending on the information about the positions on the network. The radio communications device is thus able to decrease the probability of occurrence of collision to thereby reduce the time taken for reestablishing the network.

16 Claims, 6 Drawing Sheets

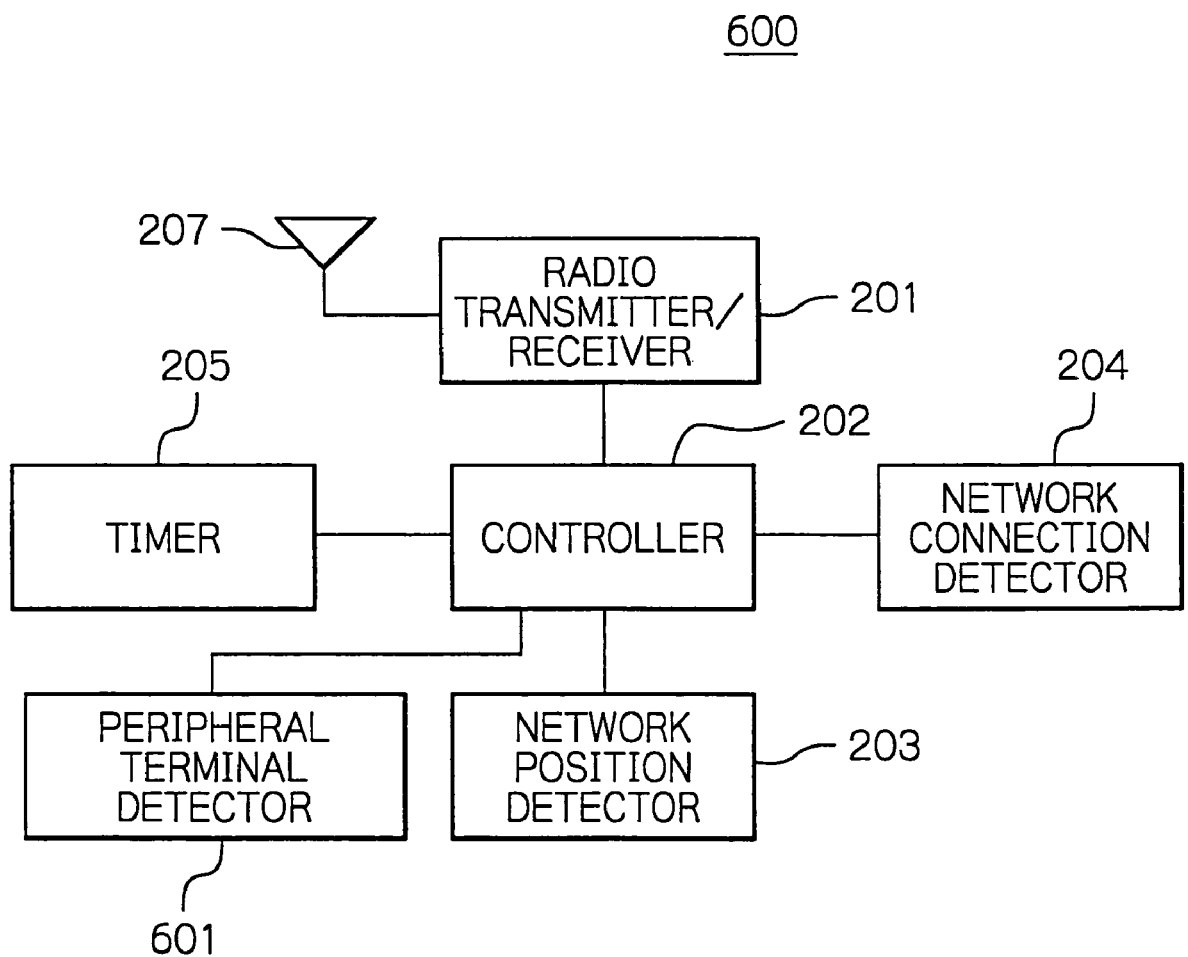

RADIO COMMUNICATIONS APPARATUS AND A METHOD FOR REESTABLISHING A NETWORK WITH A JOIN SIGNAL TRANSMITTED AT VARIABLE TIMING

BACKGROUND OF THE INVENTION

1. Field of the Invention

The present invention relates to a radio communication apparatus for establishing a radio telecommunications network, and also to a method for reestablishing a radio telecommunications network of a radio communication apparatus.

2. Description of the Background Art

A radio communication system for establishing a radio telecommunications network, such as a multi-hop network, may be formed into a tree structure as its network topology, i.e. tree topology. The tree topology is more advantageous over the other types of network topology, e.g. in simplicity of the management of routing information.

By way of example of a radio communication system employing the tree structure for network topology, there is ZigBee (trademark of Koninklijke Philips Electronics N.V.) network system, which is disclosed by, for example, "ZigBee Specification", Document 053474r13, ZigBee Alliance, pp. 323-352, according to which a radio communications device, or node, when going to join the network, sends out a signal to join the network to the nodes that form the network so as to start joining the network.

Reference will be made first to FIG. 1 for further describing a conventional network reestablishing operation for better understanding the present invention. FIG. 1 is a schematic block diagram showing a tree topology network 100, which comprises a base station 102, nodes 1000-1121 denoting radio communications devices and links 110 between the nodes 1000-1121 denoting routings. The nodes 1000-1121 constitute a hierarchical or layered tree structure where the node 1000 is a root node thereof, and in one level lower than the node 1000 is the node 1100, which resides in a higher layer, or level, in the hierarchy than the nodes 1110 and 1120 and in the same layer as the node 1200.

In such a tree topology network, if the node 1000 serving as the root node becomes inoperable so that the remaining nodes 1100-1121 have to be disengaged from the network all at once, then those nodes simultaneously send out signals for participating in the network, so-called join signals, which will in turn cause numerous collisions, thereby taking so much time to reestablish the network. Furthermore, the establishment of a tree structure depends on the timing at which join signals are transmitted. Therefore, if all nodes send out the join signals simultaneously, the network reestablished may significantly differ in tree structure before reestablished. By way of example, after reestablished, the node 1200 could be in a lower layer than the node 1100.

In a network having its tree structure established on the basis of the physical positional relationship of the nodes, the problems become more pronounced if higher nodes become inoperative.

SUMMARY OF THE INVENTION

It is therefore an object of the present invention to provide a radio communication apparatus that allows a reduced time to be taken for reestablishing a radio telecommunications network and the network to maintain its tree structure, after reestablished, as well as possible. It is also an object of the invention to provide a method of reestablishing a radio telecommunications network of such a radio communication apparatus.

In accordance with the present invention, a radio communications apparatus for sending and receiving a signal for use in joining a radio telecommunications network and for establishing the network comprises: a position detector for detecting information on a position of the apparatus on the network; a connection detector for detecting disengagement of the apparatus from the network; and a controller for controlling timing of transmitting the signal, the controller being responsive to the information detected to define a transmission timeout period which commences upon the disengagement detected and upon expiring of which the signal is transmitted.

Also in accordance with the present invention, a radio communications system is provided which includes the radio communications apparatus in plural.

Further in accordance with the present invention, a method for reestablishing a network of radio communications devices, which send and receive a signal to join the network to establish the network, comprises the steps of: detecting disengagement of the device from the network; detecting information on a position of the device on the network; defining, in response to the information, a transmission timeout period which commences upon the disengagement detected and upon expiring of which the disengagement is detected; and sending out the signal upon a lapse of the transmission timeout period.

In the present invention, on the basis of information on the position of the radio communications apparatus on a network, a transmission timeout period is varied, which starts when a signal for joining the network is sent out and is timed over when the node pulls out of the network, whereby it is possible to reduce the time taken for reestablishing the network and better maintain the tree structure after the reestablishment of the network.

BRIEF DESCRIPTION OF THE DRAWINGS

The objects and features of the present invention will become more apparent from consideration of the following detailed description taken in conjunction with the accompanying drawings in which:

FIGS. 5 and 6 are schematic block diagrams, like FIG. 2, showing further alternative embodiments of a radio communications device according to the present invention.

DESCRIPTION OF THE PREFERRED EMBODIMENTS

Figure 1:
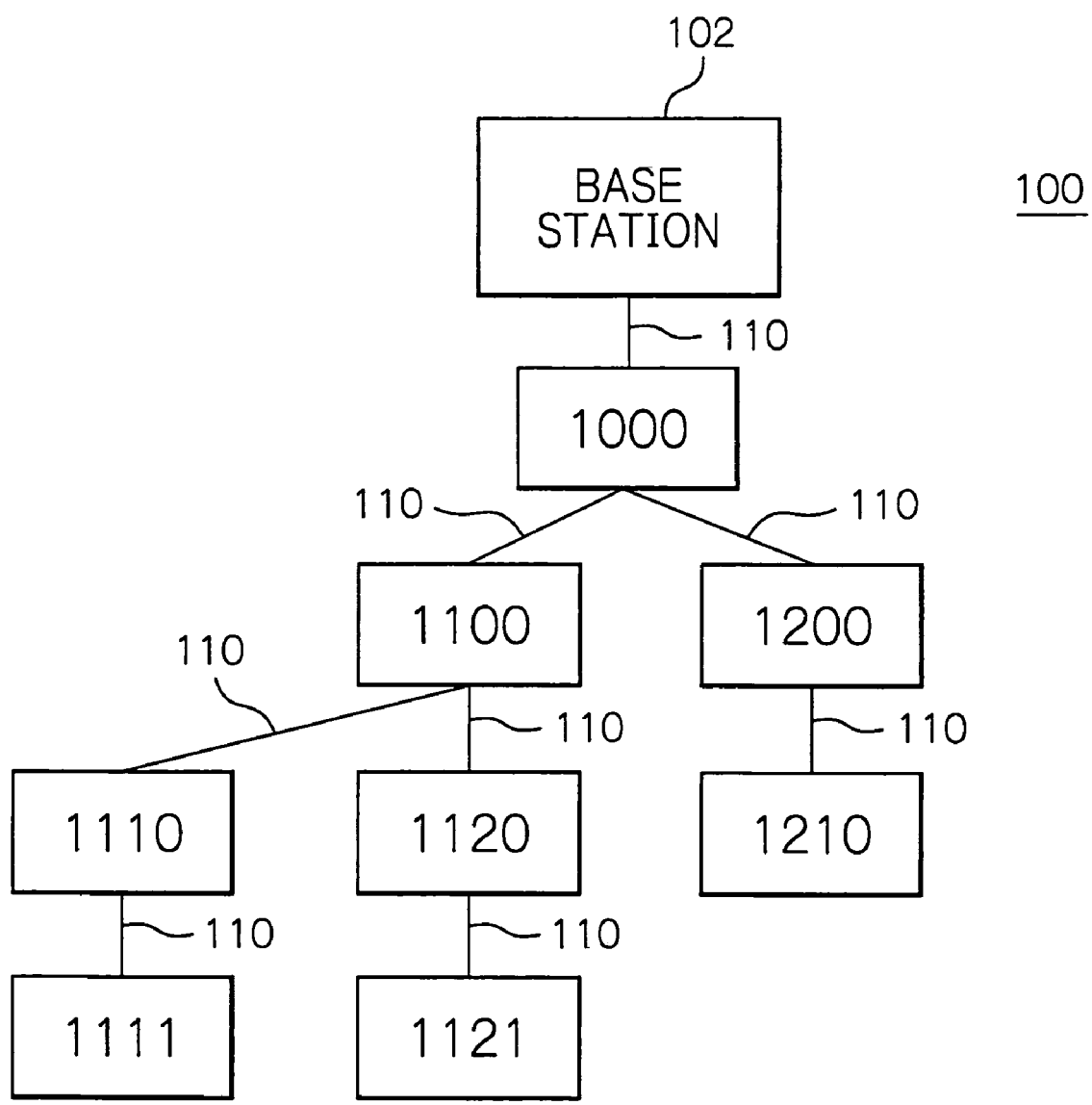
FIG. 1 is a schematic block diagram showing an example of tree topology a telecommunications network.
Figure 2:
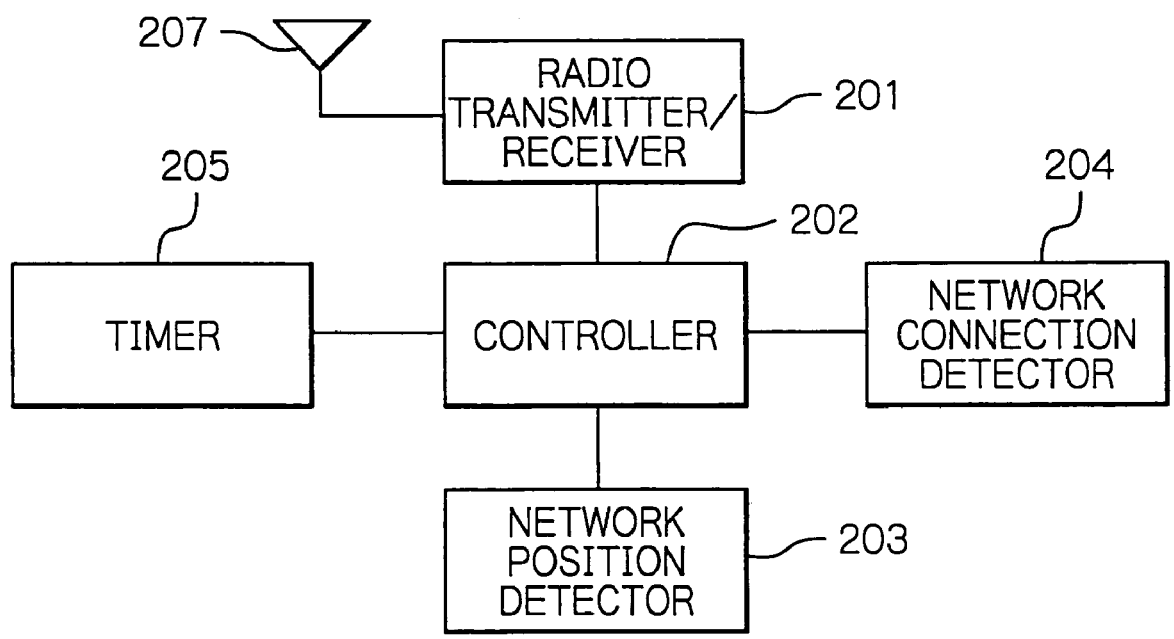
FIG. 2 is a schematic block diagram showing an illustrative embodiment of a radio communications device according to the present invention.

With reference to the accompanying drawings, a preferred embodiment of the a radio communication apparatus according to the present invention will be described in detail. FIG. 2 shows the configuration of a wireless, e.g. radio communications device 200 of a preferred embodiment of the invention. The radio communications device 200 forms a communication node of a radio communications network, such as the network 100, FIG. 1, having a tree topology, to be capable of joining the network 100. The radio communications device 200 comprises a radio transmitter/receiver 201, a controller 202, a network position detector 203, a network connection detector 204 and a timer 205, which are interconnected as illustrated. The invention is not restricted to the specific configuration of a radio communications device of the preferred embodiments.

The radio transmitter/receiver 201 is connected to the controller 202 and is adapted to receive and transmit signals on radio waves by means of an antenna 207 under the control of the controller 202. For example, the radio transmitter/receiver 201 transmits a join signal under the control of the controller 202.

The controller 202 is connected to the network position detector 203, the network connection detector 204 and the timer 205 as well as the radio transmitter/receiver 201. The controller 202 has the functions of controlling the radio transmitter/receiver 201 to perform a multi-hop communication over the radio communications network 100, of controlling the network position detector 203 to acquire information on the position of the node 200 on the network, and of controlling the network connection detector 204 to acquire detection information on whether or not the radio communications device 200 is connected to the network 100. The controller 202 also has the function of controlling the timer 205 to manage a period of time elapsing since the disengagement detected on the node 200 up to the transmission of a join signal. The period of time may sometimes be referred to as a join signal transmission timeout period.

The network position detector 203 is connected to the controller 202 and has the function of detecting information on the position of the radio communications device 200 on the network 100 to feed the detection result to the controller 202. In the illustrative embodiment, the information on the position of the node 200 on the network, or positional information, can be defined by the number of hops 110 from the root node, or root terminal, such as 1000, FIG. 1, to the node 200 on which the radio communications device 200 is installed and which may sometimes be referred to as own node. The network position detector 203 can be adapted to be interconnected to any elements in the communication device 200. For example, the detector 203 may be connected to the radio transmitter/receiver 201.

The network connection detector 204 is connected to the controller 202, and has the function of detecting whether or not the radio communications device 200 is connected to the wireless communications network 100. When the network connection detector 204 detects that the radio communications device 200 pulls out of the network 100, the detector 204 delivers to the controller 202 a detection signal representative of the pulling out. Whether or not the radio communications device 200 is connected to the network 100 can be detected by determining whether or not the node located upper, i.e. closer to the root node, than the own node, or the radio communications device 200, is operable. That is, when the other radio communications device located in the higher layer in the tree-structured network 100 is disengaged from the network 100, it is detected that the radio communications device 200 of the owe node has been disengaged from the network 100.

The timer 205 is connected to the controller 202 and is adapted to work as a common timer under the control of the controller 202.

In this configuration, the radio communications device 200 of the illustrative embodiment forms a radio communications network 100, in which join signals are transmitted and received to thereby establish a network having a tree topology. Specifically, the radio communications device 200, whenever disengaged from the network 100, transmits join signals at the timing which is different according to its position on the network 100. More specifically, the node 200 has its join signal transmission timeout period shorter as it is located on the higher layer of the network 100.

The above performance will now be described in detail with reference to FIG. 3, which is a state transition diagram of the radio communications device 200 shown in FIG. 2. More specifically, this diagram schematically shows the operations for disengaging the radio communications device 200 from the network 100 and transmitting join signals under the control of the controller 202 to participate in, or join, again the network 100. Of course, other than the state of disengaging itself from and re-joining the network 100, the controller 202 has various control states of multi-hop transmission, which are not relevant to understanding the invention and will not specifically be described or depicted in order to avoid complexity.

Figure 3:
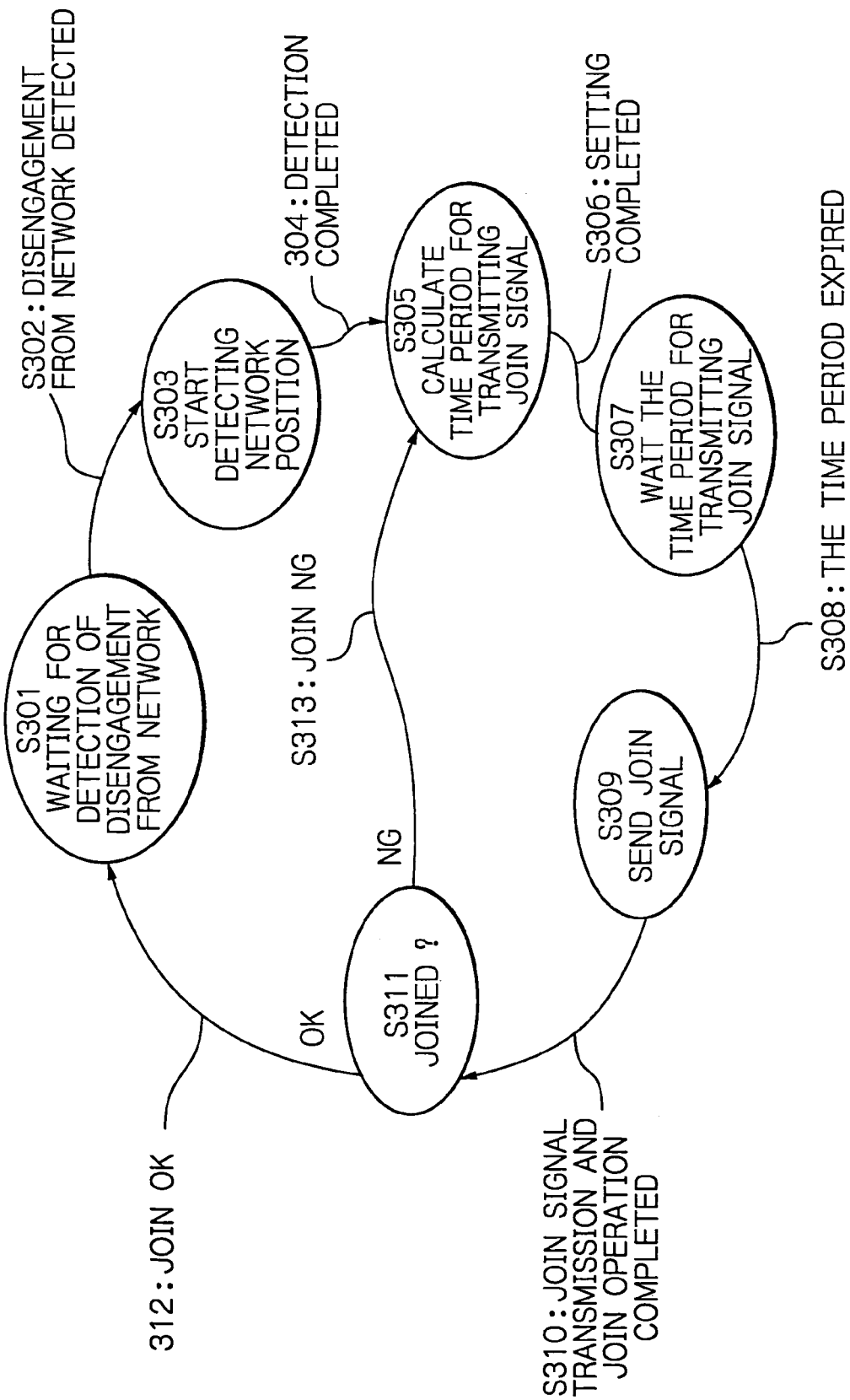
FIG. 3 is a state transition diagram of the radio communications device shown in FIG. 2.

In FIG. 3, the controller 202 is in a state or step S301 of waiting for a network disengagement detection signal delivered from the network connection detector 204 in the normal circumstances where the communication device 200 is connected to the network 100. In the context, the disengagement of a node 200 from a radio network 100 may be caused not only by the actual disengagement of the radio communications device 200 from the network 100 but also by a node rendered inoperable which is located immediately closer to the root node, or in the higher layer, than the own device 200.

When detecting the disengagement from the network 100, the network connection detector 204 delivers a network disengagement detection signal to the controller 202, so that the controller 202 detects the disengagement from the network 100 by the detection signal (step S302). The controller 202 in turn has the network position detector 203 detect the position of the radio communications device 200 on the network (step S303). The "position on the network" can be defined with the number of hops from the root node, i.e. root terminal, as described earlier.

The position on the network is detected (step S304), and thereafter the controller 202 calculates a timeout period for transmitting a join signal, i.e. join signal transmission timeout period, according to the position on the network to set the calculated time period in the timer 205 (step S305). The timeout period for transmitting a join signal is set shorter if the node 200 is near its root node and set longer if the node is at a distance from its root node. That is, the higher the node 200 locates in the hierarchy, the shorter the join signal transmission timeout period is set.

After setting the join signal transmission timeout period (step S306), the controller 202 changes into a state or step S307 of waiting for the timer 205 to reach its timeout value, i.e. the controller 202 waits during the calculated join signal transmission timeout period. The controller 202 detects when the time period expires in the timer 205 (step S308), and in turn sends out a join signal (step S309) so as to perform the operations for joining the network 100, i.e. the join operations (step S310).

The controller 202 then determines whether or not the node 200 is connected to, or joined the network 100 by means of the network connection detector 204 (step S311). If a connection is established to the network 100 (step S312), then the controller 202 changes into the state of waiting for a network disengagement detection signal (step S301) as described above. On the contrary, if the node 200 is disengaged from the network 100 (step S313), then the controller 202 recalculates a join signal transmission timeout period to set the time period thus obtained in the timer 205 (step S305). In the latter case, a time period may be set shorter in the timer 205 than the period previously set in order to facilitate a connection to be established to the network 100.

As described above, in the illustrative embodiment, the join signal transmission timeout period commencing when the radio communications device 200 establishing a tree topology network detects its disengagement from the network 100 and timed out when a join signal is sent out is defined shorter as the device locates in the higher layer on the network 100. Consequently, when plural nodes 200 disengage from the network 100 and sends out join signals, the nodes 200 positioned closer to the root node, i.e. nodes with fewer hops 110 up to the root node, send out join signals earlier in timing than the nodes 200 which locate farther from the root node, i.e. nodes with more hops 110 up to the root node. As a result, the nodes 200 which were positioned in higher layers before disengaged from the network 100 will join the network 100 in the sequence of upper to lower layers to thereby reestablish a new tree structure. Thus, the tree structure can be better maintained after the reestablishment of the network 100.

Furthermore, since the nodes transmit join signals at the timing which differs depending on the position thereof on the network, the probability in occurrence of collisions can be decreased, and thereby a time period taken for reestablishing the network can be reduced.

Figure 4:
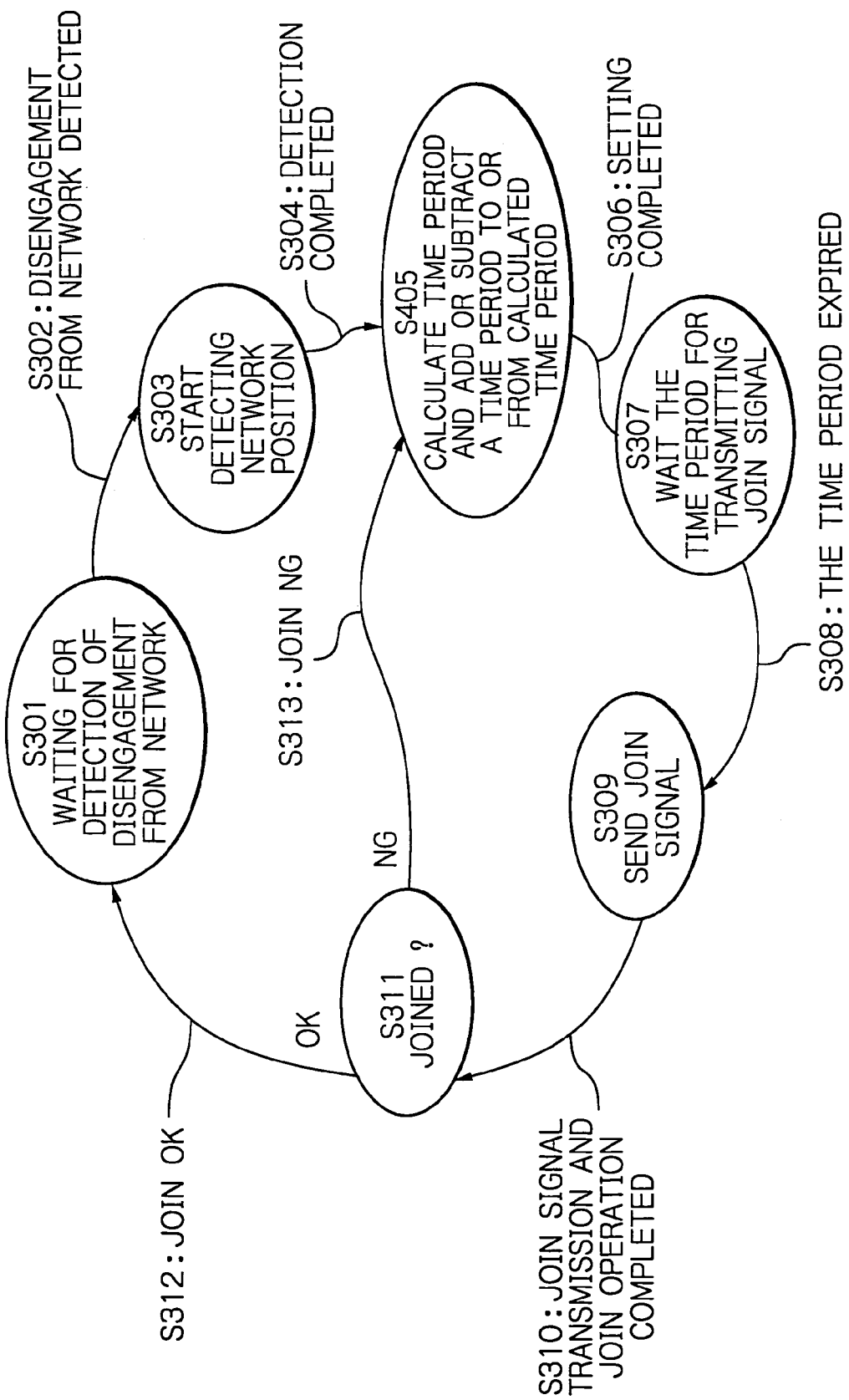
FIG. 4 is a stage transition diagram of an alternative embodiment of the radio communications device according to the present invention.

Reference will now be made to FIG. 4 for describing join operations performed by an alternative embodiment of the radio communications device 200 shown in FIG. 2. FIG. 4 is a state transition diagram of the alternative embodiment. In the following, like structural parts or elements will be designated by identical reference numerals, and not repetitively be described in order to avoid redundancy.

In order to reduce the possibility that nodes residing in the same position on the network send out join signals almost at the same timing to collide with each other to thus raise the possibility in signal collision, the alternative embodiment is adapted to define the join signal transmission timeout period which is variable, or made fluctuated, within a tolerance of predetermined time period so as to provide variations in timing of transmitting join signals.

In the sequence shown in FIG. 4, the controller 202 detects disengagement from the network 100 by performing operations, i.e. steps S301 to S304, similar to those in the illustrative embodiment shown in FIG. 3. When the controller 202 calculates a join signal transmission timeout period according to the position of the own node 200 on the network 100, the controller 202 adds or subtracts a time period of which the value randomly varies at a predetermined time interval to or from a provisionally calculated value of the timeout period, thereby defining the resultant value as a renewed timeout period to set it in the timer 205 (step S405). The predetermined time interval is preferably set shorter than the aforementioned time period which is dependent upon the position of the node 200 on the network 100 so that the tree structure can be better maintained. The communication device 200 subsequently performs the join operations in a similar fashion to the operations, i.e. steps S306 to S313, described in relation to the illustrative embodiment shown in FIG. 3.

As described above, the alternative embodiment has an advantage as well as the advantages presented by the embodiment shown in FIG. 3. Specifically, a join signal transmission timeout period is thus variable within a prescribed time interval, so that the timings of transmission of join signals differ even between the nodes 200 located at the same position or layer on the network 100, thereby decreasing the probability of collision occurrence. In consequence, the time taken for reestablishing the network can more effectively be reduced.

Figure 5:
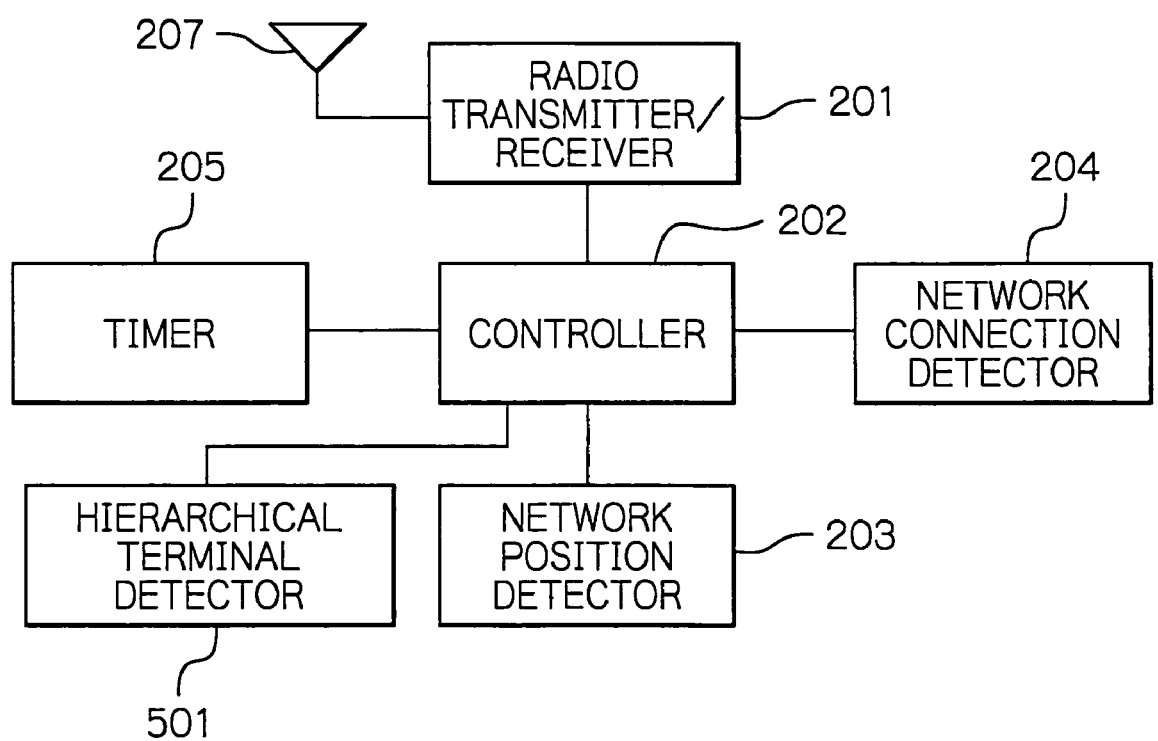

Reference will be made to FIG. 5 for describing another alternative, specific radio communications device according to the present invention. FIG. 5 is schematic block diagram, like FIG. 2, showing the other alternative radio communications device 500 according to the present invention.

The radio communications device 500 may be substantially the same as the communication device 200 except that it has a hierarchical terminal detector 501 which is adapted to detect the number of nodes or terminals 500 at the same position or layer on a radio communications network in order to reduce the probability of occurrence of collisions even when more nodes 500 stay at the same position on the network.

More specifically, in the radio communications device 500, when the controller 202 calculates a join signal transmission timeout period according to the position of the own node on the network, the controller 202 has the hierarchical terminal detector 501 detect the number of nodes at the same position, or layer, as the own node 500 on the network. If the detector 501 detects an increase in the number of nodes 500 at the same position on the network, then the controller 202 defines the value of the aforementioned predetermined time interval longer.

Thus, the radio communications device 500 may have its join signal transmission timeout period with a time interval variable at random to be set longer when more nodes reside at the same position on the network. As a consequence, in addition to the advantages provided by the illustrative embodiments shown in and described with reference to FIGS. 2, 3 and 4, it is possible for the other alternative embodiment shown in FIG. 5 to decrease the probability of collision occurrence as well as reducing the time taken for reestablishing the network.

Now, further reference will be made to FIG. 6 for describing still another alternative, specific radio communications device according to the present invention. FIG. 6 is a schematic block diagram, like FIG. 2, showing the still other alternative radio communications device 600 according to the present invention.

The radio communications device 600 may be substantially the same as the communication device 200 except that the device 600 has a peripheral terminal detector 601 for detecting the number of nodes or terminals, whose physical positions are within a range of predetermined distance, e.g. radius, from the own radio communications device 600. When more nodes 600 stay within the predetermined distance range, the controller 202 in this embodiment defines the aforementioned, predetermined time interval longer. Of course, the radio communications device 500 may have a detector corresponding to the hierarchical terminal detector 501, FIG. 5, in addition to the peripheral terminal detector 601.

The radio communications device 600 thus may set its join signal transmission timeout period with a time interval variable at random to be set longer when more nodes are included, or neighbor, within the predetermined distance range. Consequently, in addition to the advantages provided by the illustrative embodiments shown in FIGS. 1 though 5, the alternative embodiment shown in FIG. 6 is able to more effectively decrease the probability of collision occurrence as well as reduce the time taken for reestablishing the network. In particular, it is more effective in a wireless network having its tree structure established on the basis of the physical positional relationship of the nodes.

The entire disclosure of Japanese patent application No. 2008-65819 filed on Mar. 14, 2008, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A radio communications apparatus for sending and receiving a join signal for use in joining a radio telecommunications network and for establishing the network, comprising:
a connection detector for detecting disengagement of said apparatus from the network;
a position detector for detecting information on a position of said apparatus on the network in response to the detecting of disengagement;
and
a controller for controlling timing of transmitting the join signal, said controller being responsive to the information detected to define a transmission timeout period which commences upon the disengagement detected and upon expiring of which the join signal is transmitted;
wherein said controller defines the transmission timeout period to be shorter the higher said apparatus resides in a hierarchy of the network.

2. The apparatus in accordance with claim 1, wherein said position detector detects as the information a number of hops passing from a root terminal to said apparatus on the network.

3. The apparatus in accordance with claim 1, wherein said connection detector detects the disengagement of said apparatus from the network when a radio communications device residing in a higher layer of the network than said apparatus disengages from the network.

4. The apparatus in accordance with claim 1, wherein said controller recalculates the transmission timeout period, and when said controller recalculates the transmission timeout period, said controller defines the transmission timeout period to be shorter than a transmission timeout period previously defined.

5. The apparatus in accordance with claim 1, wherein said controller adds or subtracts a time having a value variable at random at a predetermined time interval to or from the transmission timeout period.

6. The apparatus in accordance with claim 5, further comprising a hierarchical terminal detector for detecting a number of terminals located in a same hierarchical layer as said apparatus,
wherein said controller defines the predetermined time interval to be longer correspondingly to the number of the terminals located in the same hierarchical layer.

7. The apparatus in accordance with claim 5, further comprising a peripheral terminal detector for detecting a number of terminals located within a range of predetermined distance from said apparatus,
wherein said controller defines the predetermined time interval to be longer correspondingly to the number of the terminals locating within the range.

8. A radio communications system comprising a plurality of radio communications apparatus, each of which sends and receives a loin signal for use in joining a radio telecommunications network in said system to establish the network, said apparatus comprising:
a connection detector for detecting disengagement of said apparatus from the network;
a position detector for detecting information on a position of said apparatus on the network in response to the detecting of disengagement;
and
a controller for controlling timing of transmitting the join signal, said controller being responsive to the information detected to define a transmission timeout period which commences upon the disengagement detected and upon expiring of which the loin signal is transmitted;
wherein said controller defines the transmission timeout period to be shorter the higher said apparatus resides in a hierarchy of the network.

9. The system in accordance with claim 8, wherein said position detector detects as the information a number of hops passing from a root terminal to said apparatus on the network.

10. The system in accordance with claim 8, wherein said connection detector detects the disengagement of said apparatus from the network when one of the plurality of radio communications apparatus which resides in a higher layer of the network than said apparatus disengages from the network.

11. The system in accordance with claim 8, wherein said controller recalculates the transmission timeout period, and when said controller recalculates the transmission timeout period, said controller defines the transmission timeout period to be shorter than a transmission timeout period previously defined.

12. The system in accordance with claim 8, wherein said controller adds or subtracts a time having a value variable at random at a predetermined time interval to or from the transmission timeout period.

13. The system in accordance with claim 12, wherein said apparatus further comprises a hierarchical terminal detector for detecting a number of terminals located in a same hierarchical layer as said apparatus,
wherein said controller defines the predetermined time interval to be longer correspondingly to the number of the terminals located in the same hierarchical layer.

14. The system in accordance with claim 12, wherein said apparatus further comprises a peripheral terminal detector for detecting a number of terminals located within a range of predetermined distance from said apparatus,
wherein said controller defines the predetermined time interval to be longer correspondingly to the number of the terminals located within the range.

15. A method for reestablishing a network of radio communications devices, which send and receive a loin signal to join the network to establish the network, said method comprising the steps of, by a radio communications apparatus:
detecting disengagement of a device from the network;
detecting information on a position of the device on the network in response to the detecting of disengagement;
defining, in response to the information, a transmission timeout period which commences upon the disengagement detected and upon expiring of which the disengagement is detected, wherein the transmission timeout period is defined to be shorter the higher said apparatus resides in a hierarchy of the network; and
sending out the loin signal upon a lapse of the transmission timeout period.

16. The method in accordance with claim 15, further comprising the step of recalculating the transmission timeout period to determine the transmission timeout period to be shorter than a transmission timeout period previously defined.